United States Patent [19]

Janson

[11] 4,152,617

[45] May 1, 1979

[54] SELECTIVELY VARIABLE TORQUE MAGNETIC BRAKE

[75] Inventor: Gunnar H. Janson, Dudley, Mass.

[73] Assignee: Dana Corporation, Toledo, Ohio

[21] Appl. No.: 854,044

[22] Filed: Nov. 22, 1977

[51] Int. Cl.² .............................................. H02K 49/00
[52] U.S. Cl. .................................. 310/103; 310/105; 310/92
[58] Field of Search ................ 310/103, 104, 105, 92, 310/93, 106, 191, 193, 209

[56] References Cited

U.S. PATENT DOCUMENTS 3,822,390  7/1974  Janson ............................. 310/104

FOREIGN PATENT DOCUMENTS 2,139,009  2/1972  Fed. Rep. of Germany ........... 310/103

*Primary Examiner*—Donovan F. Duggan

*Attorney, Agent, or Firm*—Vincent L. Barker, Jr.; Robert Leonardi

[57] ABSTRACT

A magnetic clutch or drag brake for a rotary shaft which is particularly adapted for use as a web or sheet tensioning control is disclosed. The device includes a first clutch element providing a selectively variable torque which is independent of shaft rotation or slip speed and a second clutch having an independently selectively variable torque which is dependent upon slip speed. The two clutch elements are associated in one housing between input and output shafts such that their clutching or braking action is cumulatively applied to the output shaft to provide an infinitely variable output from zero to maximum shaft speeds. The first clutch element utilizes the principal or magnetic hysteresis of a driven disc of high hysteresis-loss material while the second clutch element utilizes the principle of magnetic eddy current variations caused by an adjustable flux gate which varies the magnetic coupling between a driven and fixed member.

10 Claims, 8 Drawing Figures

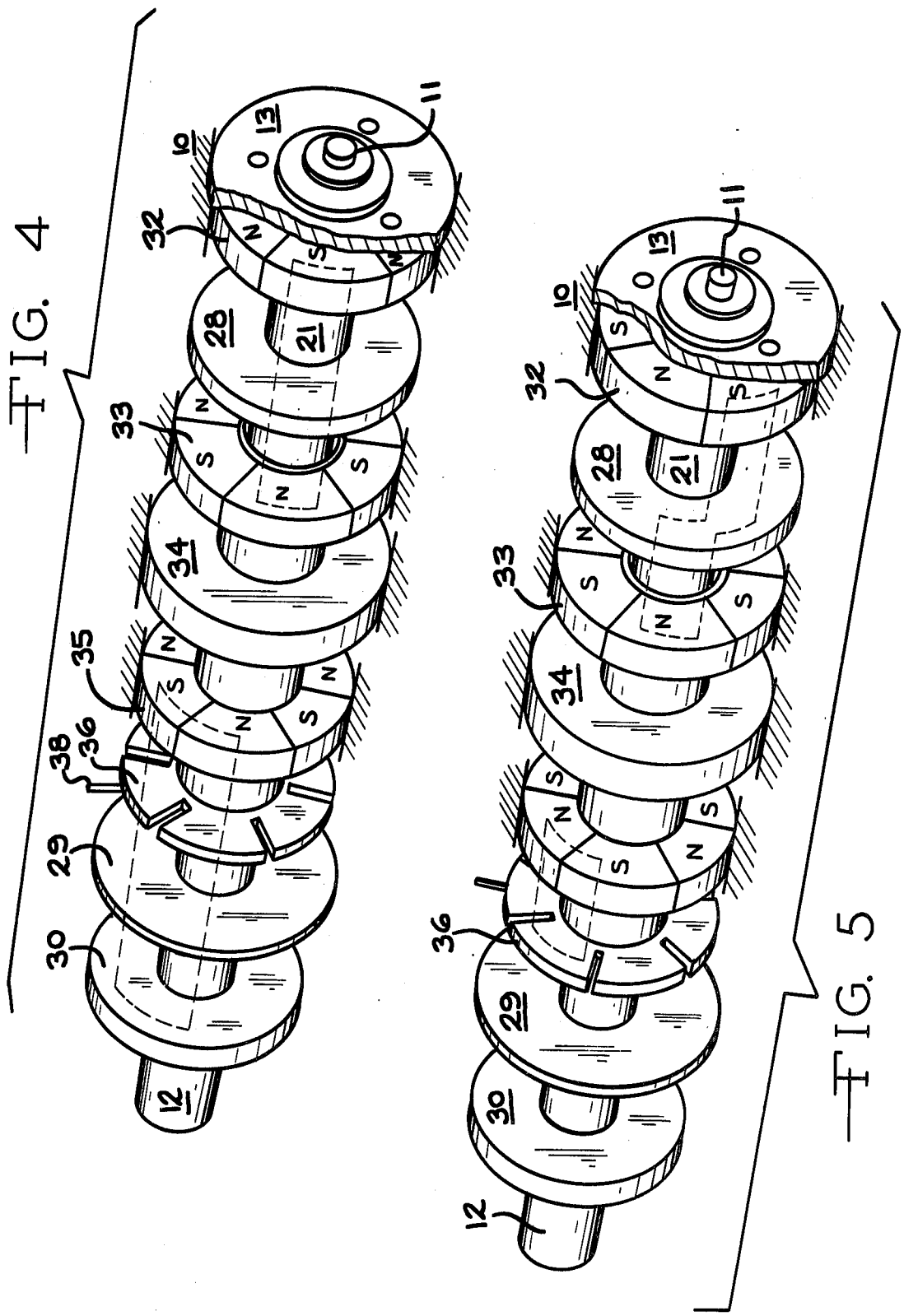

SELECTIVELY VARIABLE TORQUE MAGNETIC BRAKE

This invention relates to a magnetic clutch or drag brake particularly adapted for use as a control means for a web tensioning device wherein an elongate web is being fed to or taken from a roll carried by rotary shaft and the resistance to rotation of the shaft determines the tension of the web. The invention herein can be used as a braking device or as a clutch for certain applications. When used as a braking device to control shaft rotation, the output shaft of the device is operarably connected to the reel or supply of the web being tensioned with the housing of the device secured against rotation. When used as a clutch, one end of the device carries an input shaft which drives the housing and the output shaft which is clutched relative to the input shaft is connected to the device being controlled. Hereinafter, the device will be generally described in terms of its clutching function, that is, with an input shaft from a source of rotary motion on one end and an output shaft on the other end, with the device being used to vary the amount of torque applied to the output shaft from the rotating input shaft. It should be understood that the principals of operation of the device is the same, whether used as a brake or clutch.

Braking or clutching devices of this general type are commonly used in web tensioning devices where a web, cord, textile strand, etc., is fed from or fed to a rotating reel with the amount of torque required to turn the wheel being determinative of the tension of the strand or web, etc. One such application is in the production of continuous rolls of tissue paper, such as toilet paper or paper towels, while other uses in the field of textile production are numerous.

It is important in applications of this nature that the torque applied to the reel or the output torque of the control device be selectively variable between a wide range of desired torques and that the control device itself be relatively free from maintenance problems, external connections and wear due to normal mechanical friction. For this reason, electric brakes requiring an external power source are less desirable than those which require no external circuit and mechanical clutches of the frictional plate variety become worn in normal use and require constant adjustment to maintain the desired torque.

These limitations have been overcome to a certain extent by the use of brakes in which permanent magnets are used to provide the braking and thus torque controlling force. Such magnets, of course, require no external circuitry and are not subject to mechanical wear as are friction dependent plate type brakes or clutches. One such permanent magnet brake is presently commercially available from the Industrial Power Transmission Division of Dana Corporation and is marketed as a tension control device which has a variable torque output controlled by the use of a slotted driven rotor which acts as a flux gate to control the amount of magnetic flux shunted or cut off between the permanent magnet sectors and a driven disc. This product is essentially independent of speed of rotation of the input shaft relative to the output shaft and therefore applies an essentially constant torque or braking action for each position of the flux gate.

However, in certain tensioning or braking applications, particularly in the tension control of a web or strand which is built up on the package, the web or strand tension will vary in accordance with the radius of the package buildup so that the torque must be varied in proportion to the speed of rotation of the package for a given web tension. The aforementioned product, because of its inherent design characteristics, is not capable of such a linear tension variation in proportion to package speed, making it unsuitable for certain applications.

On the other hand, a brake whose torque or braking action is purely responsive to speed would not be satisfactory for use in tension or web control because at zero speed, there would be no braking action. This would mean that at zero or at very low speeds, there would be essentially no resistance to movement of the package and accordingly little or no tension applied on the web.

The invention of this application is a braking or clutching device particularly adapted for use as a web tension control which has the heretofore mentioned advantages of a permanent magnet-actuated device free from external circuitry and wear problems and which has the capability of applying torque at zero speed. The instant invention is also capable of applying a progressively increasing torque in response to speed changes, starting from a predetermined zero speed torque. Through use of the invention, the operator may selectively vary the zero speed torque and selectively vary the slope or rate of linear torque with increased speed.

In brief summary, two separate braking or clutching elements are incorporated into the same housing and provide separate and selectively adjustable torque controls between the input shaft and an output shaft. The torque applied between the input and output shaft is cumulative in that the output shaft realizes both a constant torque at zero speed and a progressively increasing (or decreasing) torque or drag as the relative shaft speed increases, (or decreases). This action is made possible by the use of two separate mechanisms, one utilizing the losses in a high hysteresis material and the other using a segmented driven flux gate which is used to effectively vary the magnetic coupling between a fixed and driven member. The operator may selectively adjust the amount of zero speed torque by relative rotation of one of the clutch elements and may also adjust the slope or increase of torque proportional to speed by relative adjustment of one of the other clutch members.

Other objects and advantages will be readily apparent to those skilled in the art from the following description of a preferred embodiment thereof.

FIG. 4 is a schematic view in perspective illustrating the operable interior elements of the clutch device invention in a first position;

FIG. 5 is a second schematic view similar to FIG. 4 but showing the same elements in a different selected position;

Figure 1:
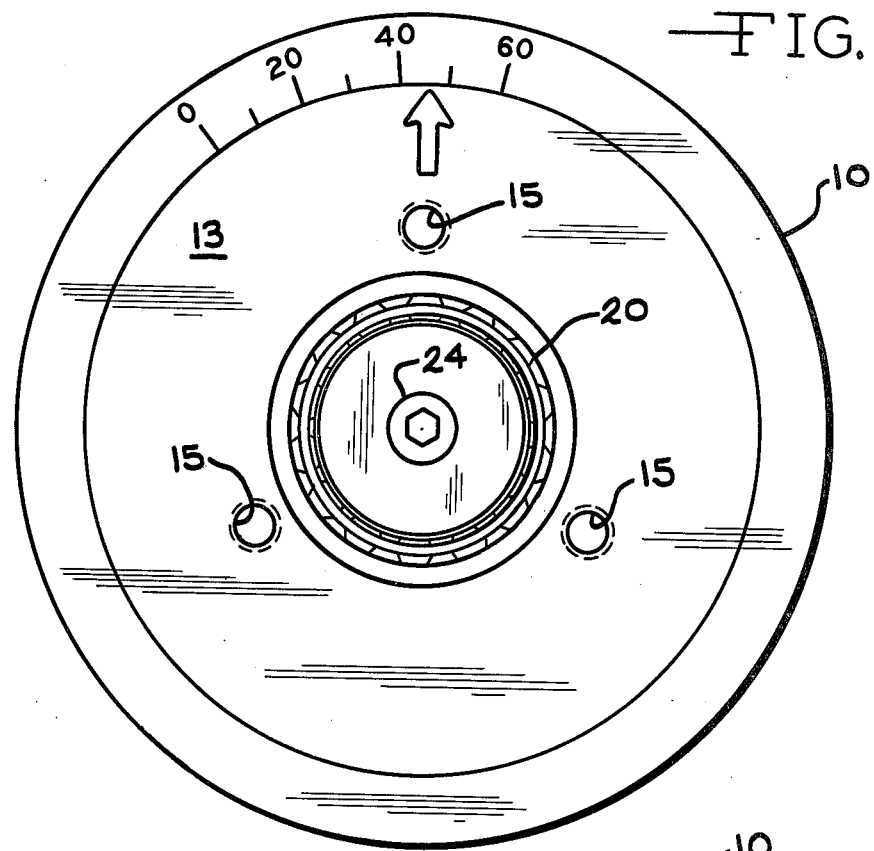
FIG. 1 is an end view of the clutch device of this invention, along the axis of the input and output shafts.
Figure 2:
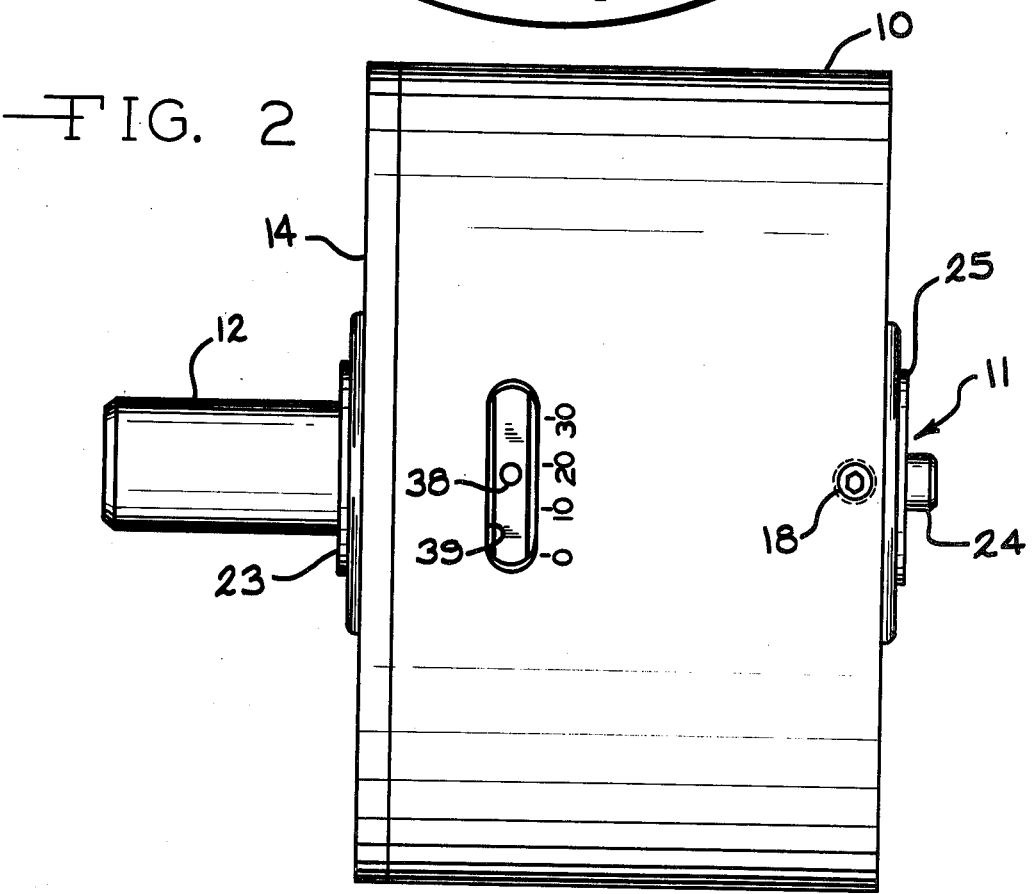
FIG. 2 is a side view of the clutch device of this invention, showing the respective input and output shafts.
Figure 3:
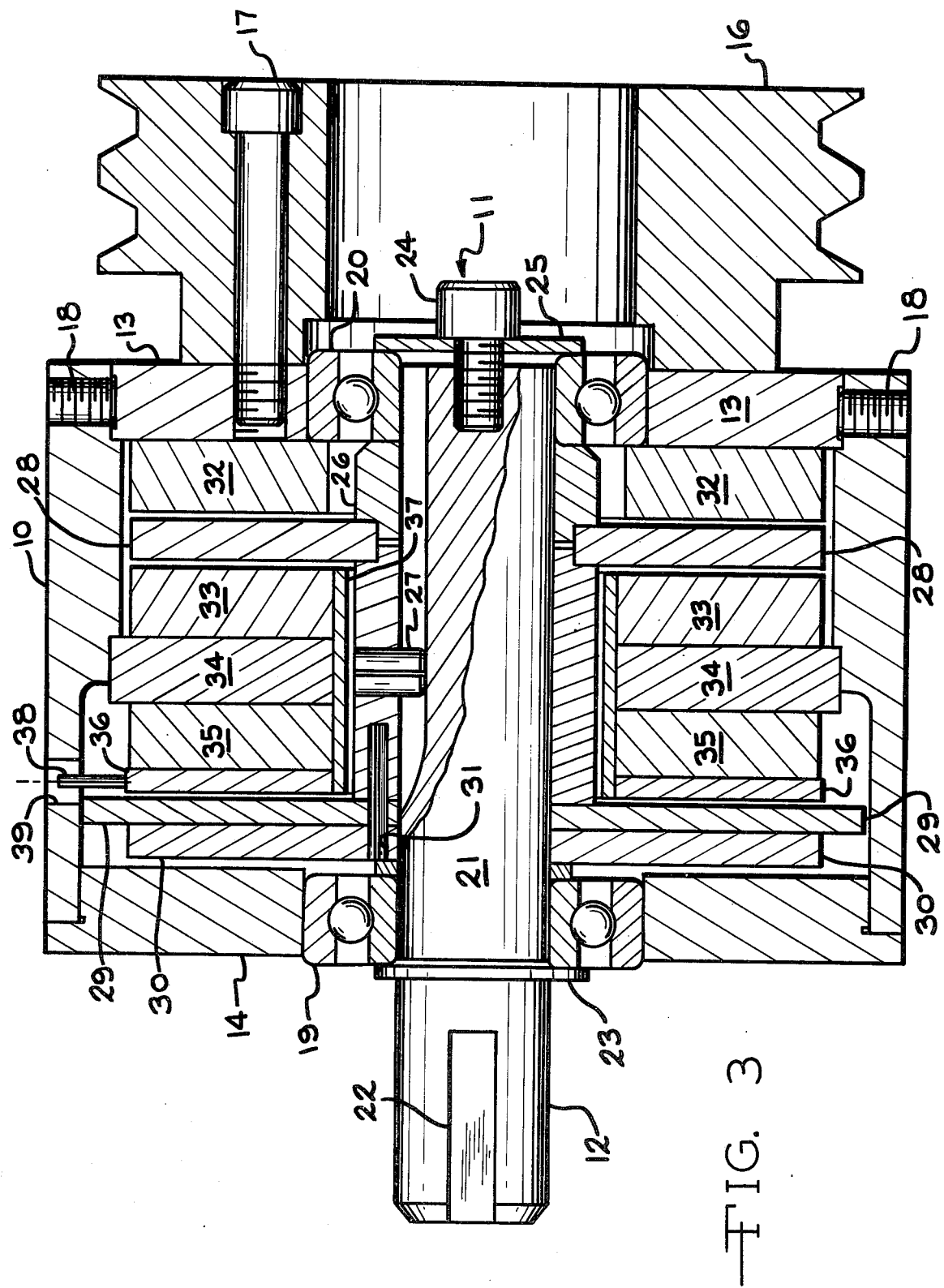
FIG. 3 is a cross-sectional view of the clutch device as it is shown in FIG. 2 but showing a drive pulley attached to the input shaft thereof.

Referring first to FIGS. 1 and 2, the device of invention includes an outer annular housing 10 which, when used as a brake device, would be mounted by brackets or by direct attachment to a fixture and secured against rotary movement. The input shaft 11 is shown on the right hand side of FIG. 2 on the output shaft 12 on the left. Each end of the annular housing 10 is covered by an end plate, the input shaft end plate 13 being shown in FIG. 1 with the output shaft end plate 14 being secured to the annular housing 10 with a flange & groove arrangement as best seen in FIG. 3. The input shaft end plate 13 includes a plurality of tapped holes 15 which receive a means for securing a drive pulley 16 as shown in FIG. 3. (The drive pulley 16 is not shown in FIGS. 1 and 2). When the device is being used as a clutch as described herein, the drive pulley 16 is secured to the end plate 13 by a plurality of cap screws 17 which extend into the tapped holes 15. The end plate 13 is rotatably secured within the annular housing 10 by one or more tapped set screws 18 while the output end plate 14 is permanently attached as by welding to the annular housing 10.

Referring to FIG. 3, a pair of ball bearings 19 and 20 are positioned within the end plates 14 and 13 respectively with their outer races in contact with an annular hole in each of these end plates. The inner race of these bearings 19 and 20 is circumjacent a shaft 21, the outer end of which is splined as at 22 to provide a means for attaching the controlled element, such as the web take up reel, etc. The outer end of this shaft 21 is the output shaft 12 of the device which has an integral collar 23 resting against the inner race of the ball bearing 19. On the other end of the shaft 21 is a axial hex screw 24 which is threaded into an axial tapped hole in the end of the shaft 21 through a disc 25 which bears against the inner race of the ball bearing 20. Secured for rotation with the shaft 21 is a tubular sleeve 26 circumjacent the interior of the shaft 21 which rotates with the shaft. The sleeve 26 could be integrally formed upon the shaft but is shown as a separate member which is locked to the shaft by a set screw or steel washer 27 which extends into an opening within the shaft.

An annular hysteresis disc 28 is secured for rotation with the shaft 21 and sleeve 26 and extends radially outwardly therefrom for rotation about the axis of the shaft 21. Spaced to the left of this hysteresis disc 28 is an eddy current disc 29 secured to an annular back up ring 30 which is likewise secured upon the shaft 21 for rotation therewith by a set screw or other type of fastening device 31 which is shown extending parallel to the shaft through the back up ring 30, eddy current disc 29 and into the sleeve 26. The eddy current disc 29 which is preferably fabricated of cooper, may be adhesively or otherwise bonded to the backup ring 30 so that both will rotate along with the shaft 21. As thus far described, the discs 28, 29 and 30 are secured relative to the shaft 21 and turn at the same speed as the outer end 12 of the output shaft.

A pair of magnetic rings 32 and 33 of identical construction are placed alongside opposite faces of the hysteresis disc 28. As seen in FIG. 5, each of these magnetic rings are of alternate pole segmented variety having 3 north and 3 south poles so that each pole covers 60° of the circumference of the ring. The first magnetic ring 32 is secured to an inner face of the input end plate 13 for movement therewith. A steel pad 34 which is annular in shape is secured to the inner surfaces of the housing 10, as by press fitting or other means, so that the magnetic ring 33 and the steel pad 34 do not move relative to the housing 10. A third magnetic ring 35 which is also of segmented alternate pole construction is secured to the opposite face of the steel pad 34 and likewise will not move relative to the housing 10. Finally, a segmented flux gate 36, the construction of which is shown best in FIG. 5, is placed adjacent the left hand face of the magnetic ring 36 and is centered by an inner tubular sleeve 37 which extends the shaft 21 inside of the steel pad 34 and its magnet 33 and 35. The segmented flux gate 36 is rotatable through a limited arc relative to the housing 10 and its associated fixed elements by means of an adjustment pin 38 which extends outwardly through an elongated aperture 39 in the housing, as best seen in FIG. 2. Having described the structural elements of the device as shown in FIG. 3, reference will now be made to FIGS. 4 and 5 to further explain their operation.

FIGS. 4 and 5 schematically show an exploded view of the various elements described previously with reference to FIG. 3. The input end plate 13, magnetic ring 32, magnetic ring 33, steel pad 34 and magnetic ring 35 are illustrated as being secured relative to the housing 10 with the understanding that these elements turn with the housing 10 if the housing is driven by the drive pulley 16 as shown in FIG. 3 or that these elements remain stationary if the device is being used purely as a brake. It should be further understood from the previous description that the hysteresis disc 28, the eddy current disc 29 and its backup ring 30 are secured for rotation with the output shaft 12 which is an extension of the shaft 21 extending through the assembly. As previously mentioned, the flux gate 36 with its adjustment pin 38 does not rotate with the output shaft 12 and is rotatable relative to the housing 10 through a limited arc. Finally, the end plate 13 and magnetic ring 32 carried thereby are rotatable relative to the housing 10 through a limited arc so that the position of the magnet 32 may be changed relative to its twin magnet 33 throughout the extent of this arc. This is also seen in FIG. 1 which shows an angular scale carried by the outer periphery of the housing 10 and an indicator arrow carried by the outer face of the end plate 13. The relative positions of the end plate 13 and housing 10 can be adjusted and locked by loosening and tightening the set screws 18 while the relative position of the flux gate 36 is fixed either by the frictional engagement between it and its adjacent member due to magnetic attraction or by some similar locking device which is detachably secured to the adjustment pin 38.

Figure 7:
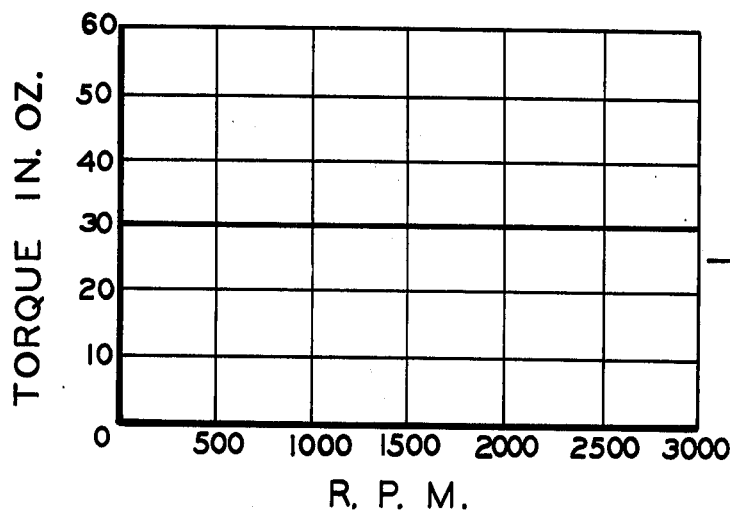
FIG. 7 is a schematic representation of the output torque of the other clutch element in this invention, showing it to be constant with speed increase.

As previously explained, there are two distinct clutch elements in the device which are positioned between the input shaft 11 and the output shaft 12 from which the torquing or braking action thereof is cumulatively applied to the output shaft 12. The first of these elements, which may be denominated as the hysteresis portion, includes all of the elements to the right of the steel pad 34 including the two magnets 32 and 33 and the hysteresis disc 28. As previously stated, this disc 28 is of high hysteresis loss material and turns with the output shaft 12 and its central shaft 21. As these elements are shown in FIG. 4, the segmented north and south pole pieces in the two magnets 32 and 33 are aligned so that a south pole in the magnet 32 is directly opposite a north pole in the magnet 33, and vice-versa around the periphery of the magnets. In this configuration, the magnetic flux lines travel directly from one pole axially through the hysteresis disc 28 to the opposite pole, representing the shortest path through the high hysteresis loss material and accordingly the minimum magnetic drag against rotation of the disc 28. When the relative positions of the magnets 32 and 33 are moved, as by adjustment of the position of the end plate 13 and magnet 32 relative to the housing 10, a different flux path is created. Referring to FIG. 5, the position of magnet 32 has been rotated relative to that of magnet 33 so that the opposite north and south poles are no longer axially opposed but have been turned approximately 30° so that a longer flux path through the hysteresis disc 28 is necessitated, causing increased hysteresis loss and thus increasing the torque on the disc 28 and shaft 21. (The flux paths are schematically shown by the dotted line.) It should be noted that the amount of hysteresis drag caused by hysteresis loss in the disc 28 is independent of speed of shaft rotation so that the amount of drag torque applied will be purely a function of the magnet strength, the type of hysteresis material used in the disc 28, etc. The amount of drag or torque on the output shaft would be represented by a constant horizontal line, independent of the speed of rotation of the disc 28, as seen in FIG. 7. This property is advantageous in that even at zero speed, a definable amount of braking action or clutching action is present at all times. When the relative positions of the magnets 32 and 33 are adjusted, this amount of constant torque is shifted upwardly or downwardly as will be understood of those skilled in the art.

Figure 6:
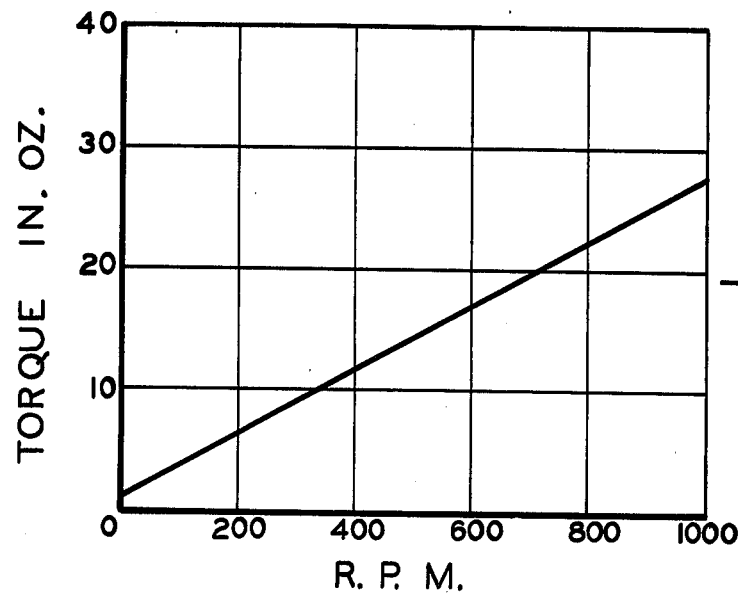
FIG. 6 is a schematic representation of output torque of one of the clutch elements which increases in response to speed increases.

The second clutch element which can be denominated as an eddy current clutch includes all of those elements to the left of the steel pad 34 shown in FIGS. 4 and 5. The position of the flux gate 36 as adjusted by the pin 38 will determine the amount of drag placed upon the eddy curent disc 29 and its backup ring 30 caused by the magnetic flux pattern from the fixed magnetic ring 35. The flux gate 38 contains a plurality of radial slots which separate it into separate radial sections. With the flux gate 36 positioned relative to the magnets 35 as shown in FIG. 4, the flux path between a north and a south pole is shown as indicated by the broken line, extending through the eddy current disc 29 and returning across the backup ring 30 to the opposite pole through adjacent sectors of the flux gate 36. In this position, the maximum amount of drag is applied to the output shaft 12 which is proportional to the relative speed of rotation between the fixed magnetic ring 35 and the driven backup ring 30 and eddy current disc 29. When the flux gate is rotated over a limited arc to a position shown in FIG. 5, the magnetic flux lines from the poles of the magnet 35 are short circuited in effect by a single sector of the flux gate 36 to reduce the torque or drag on the output shaft. Thus the amount of torque or drag on the output shaft is varied by the angular position between the flux gate 36 and its adjacent fixed magnet 35. In any event, the torque or drag on the output shaft 12 is proportional to speed, as is indicated in FIG. 6, with there being practically zero torque at zero speed.

Figure 8:
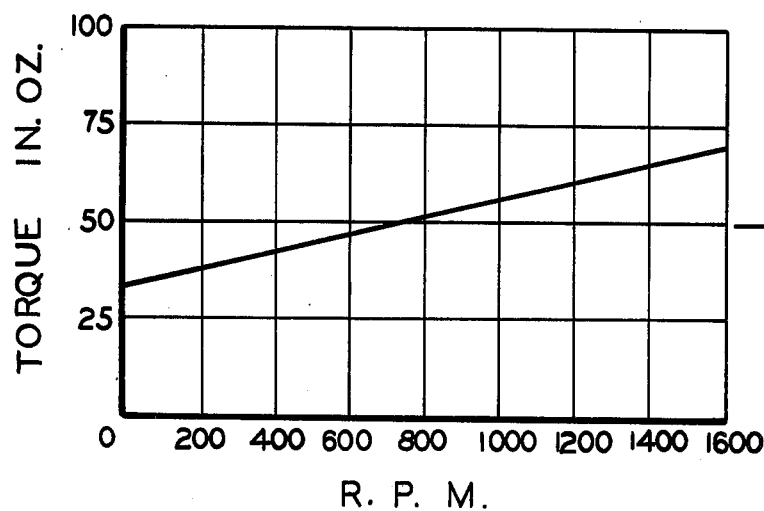
FIG. 8 is a schematic representation of the output torque of the clutch device of this invention at a selected position using the cumulative effect both clutch elements.

Because the effect of the two sections previously described is cumulative, the ultimate characteristic of the device is shown in FIG. 8 as having a preselected constant torque at zero speed which increases linearly with increase in speed. It will be understood that the slope of the line in FIG. 8 and its magnitude at zero speed can be varied by the selective adjustment of the relative positions of the end plate 13 relative to the housing and of the flux gate 36 relative to the housing. It is also to be understood that the absolute values for torque and RPM shown in FIGS. 6 through 8 are only representative of a range of values which can be representative for this device with these values controlled by selection of the strength of the magnets, the type of materials used and the physical configurations of the various elements as thus described above.

It will be seen from the above description that the instant invention provides in a single unit a clutch or braking device ideally suited for the control of a web tensioning device which requires the application of a constant torque at zero speed and an increasing or decreasing torque as the web package is built up or reduced. At the same time, the invention provides these advantages without the attendant disadvantages of external electrical connections or friction based devices.

Other advantages of the invention will be apparent to those skilled in the art without departing from the spirit and scope of the claims.

The embodiments of the invention in which an exclusive property or privilege is claimed are defined as follows:

1. A magnetic clutch having a selectively variable output torque applied to a rotary shaft comprising, in combination, a rotary input shaft and a rotary output shaft; a first magnetic clutch element including a spaced apart pair of permanent magnets secured for rotation with said input shaft, each of said pair of magnets having at least one pair of north-south poles, and an annular disc of high loss hysteresis material secured to said output shaft and extending between said pair of magnets with means to selectively vary the relative angular position of said pair of magnets about the axis of said output shaft to thereby vary the magnetic flux path through said hysteresis disc and thus the torque applied thereto; and a second magnetic clutch element including a permanent magnet secured for rotation with said input shaft, said latter magnet having at least one pair of north-south poles and spaced axially from a driven ferromagnetic annular ring such that relative rotation of said latter magnet will respectively reverse the north-south flux pattern within said ring to induce a torque, proportional to speed therein, and a flux gate positioned axially between said latter magnet and said driven ring, said flux gate being selectively movable about the axis of said output shaft relative to said latter magnet to effectively shunt portions of said flux pattern to thereby selectively vary the torque induced in said ring whereby the torque applied to said output shaft is the sum of the torque from said first and second magnetic clutch elements.

2. The magnetic clutch of claim 1 wherein said pair of spaced apart permanent magnets are annular discs having a plurality of north-south poles spaced about their periphery.

3. The magnetic clutch of claim 2 wherein said annular disc magnets include three pairs of alternately space north-south poles.

4. The magnetic clutch of claim 1 which further includes a hollow cylindrical housing circumjacent said first and second magnetic clutch elements with an end plate over each end thereof, one of said end plates secured to said input shaft with said output shaft extending through and journaled for rotation in a central aperture in the other of said end plates.

5. The magnetic clutch of claim 4 wherein said flux gate includes a portion extending radially through said housing to provide an external means for rotation thereof relative to said housing and said latter magnet.

6. The magnetic clutch of claim 4 wherein said one end plate secured to said input shaft is selectively rotatable relative to said housing over a limited arc and wherein one of said pair of magnets is secured relative to said end plate with the other of said pair secured relative to said housing such that rotation of said end plate relative to said housing through said limited arc will vary the relative angular position of said pair of magnets.

7. The magnetic clutch of claim 6 which further includes means for selectively locking said one end plate in a fixed position relative to said housing.

8. The magnetic clutch of claim 1 wherein said flux gate is an annular disc of ferromagnetic material having a plurality of radial slots extending from the periphery thereof to divide said disc into physically and magnetically separate segments.

9. The magnetic clutch of claim 8 wherein the number of segments in said flux gate is equal to the number of poles in said latter magnet.

10. The magnetic clutch of claim 4 wherein said output shaft is an extension of an interior clutch shaft extending between said end plates and journaled for rotation by a bearing in a central aperture in each of said plates.

* * * * *